(12) United States Patent
Heskestad

(10) Patent No.: US 7,210,995 B2
(45) Date of Patent: May 1, 2007

(54) ROOF AIR MAKE-UP FOR EXHAUST OF FIRE SMOKE

(75) Inventor: Gunnar Heskestad, Dover, MA (US)

(73) Assignee: FM Global Technologies, LLC, Johnston, RI (US)

( * ) Notice: Subject to any disclaimer, the term of this patent is extended or adjusted under 35 U.S.C. 154(b) by 177 days.

(21) Appl. No.: 10/688,993

(22) Filed: Oct. 21, 2003

(65) Prior Publication Data

US 2005/0085179 A1   Apr. 21, 2005

(51) Int. Cl.
*F24F 7/04*   (2006.01)

(52) U.S. Cl. .................. 454/342; 454/357; 454/903; 454/306

(58) Field of Classification Search ............. 454/253, 454/306, 342, 357, 903, 248, 252, 265, 274, 454/298
See application file for complete search history.

(56) References Cited

U.S. PATENT DOCUMENTS

| | | | |
|---|---|---|---|
| 2,775,927 A | | 1/1957 | Wulle |
| 3,337,990 A | * | 8/1967 | Iwata .............................. 49/3 |
| 3,694,222 A | * | 9/1972 | Pardoel et al. .............. 454/253 |
| 3,817,161 A | * | 6/1974 | Koplon ........................ 454/342 |
| 4,054,084 A | * | 10/1977 | Palmer ........................ 454/342 |
| 4,058,253 A | * | 11/1977 | Munk et al. .............. 236/46 R |
| 4,346,692 A | | 8/1982 | McCauley |
| 4,403,732 A | * | 9/1983 | Primich ........................ 237/50 |
| 4,902,315 A | | 2/1990 | Spicer |
| 5,044,259 A | | 9/1991 | Catan et al. |
| 5,092,313 A | * | 3/1992 | Blackburn et al. .......... 126/512 |
| 5,213,542 A | | 5/1993 | Kelly |
| 5,285,771 A | | 2/1994 | Griffes |
| 5,346,426 A | | 9/1994 | Kronfalt |
| 5,370,578 A | * | 12/1994 | Yi .............................. 454/305 |
| 5,582,544 A | | 12/1996 | Ely |
| 5,655,963 A | * | 8/1997 | Paschke et al. .............. 454/297 |
| 5,851,144 A | * | 12/1998 | Nystrom ...................... 454/306 |
| 6,478,672 B1 | | 11/2002 | Ewald et al. |
| 6,540,605 B1 | * | 4/2003 | Lesage ........................ 454/231 |

* cited by examiner

*Primary Examiner*—Gregory Wilson
(74) *Attorney, Agent, or Firm*—Merek, Blackmon & Voorhees, LLC

(57) ABSTRACT

A system for introducing make-up air into a building from above the roof for smoke control includes air shafts extending from the roof into a space in the building below a layer of smoke. The air shafts can be rigid or can be made of a flexible material which folds up when not in use. Air shafts of a flexible material have a contraction at the exit to inflate the shaft, unless the shaft extends to within one diameter from the floor.

19 Claims, 3 Drawing Sheets

ROOF AIR MAKE-UP FOR EXHAUST OF FIRE SMOKE

BACKGROUND OF THE INVENTION

The state of the art in control of smoke from fire in large-volume spaces is to exhaust smoke at one or several openings in the ceiling and to provide low-velocity air make-up through wall openings near the floor. Under optimum conditions, the smoke accumulates in, and is exhausted from, an upper layer, while a clear layer is maintained above the floor. This facilitates egress of occupants and access to the fire by fire fighters, and limits smoke damage. Often, it is difficult to provide the required wall entry area for make-up air.

SUMMARY OF THE INVENTION

The present invention allows outside air to enter from openings in the roof without the lower, clear layer being contaminated by smoke entrained from the upper layer. The system of introducing uncontaminated make-up air for smoke control into a building from above the roof uses air shafts from the roof to a level below the smoke interface. The air shafts can be rigid or can be made of a flexible material which folds up when not in use. The operation of a shaft of flexible material is made stable with a slight contraction at the exit of the shaft, which is below the smoke interface and which inflates the shaft in cooperation with incoming air. Alternatively, if the contents of the large-volume space permit the flexible shaft to extend to within one shaft diameter or shaft width from the floor, a ground effect inflates the shaft and allows stable operation. In the latter case, a contraction is not required.

DETAILED DESCRIPTION OF THE PREFERRED EMBODIMENTS

Figure 1:
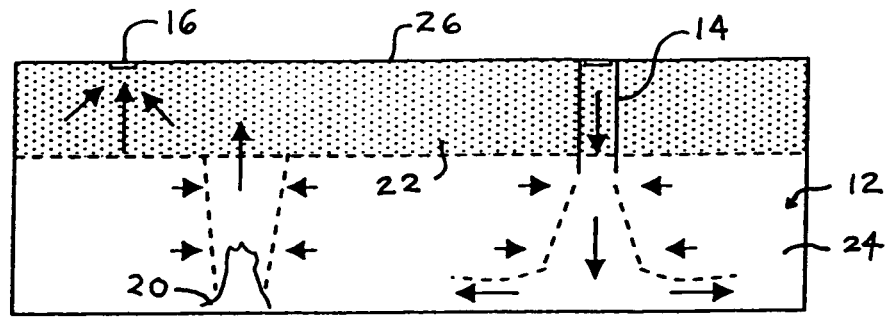
FIG. 1 is a schematic cross-section of a space employing the system according to the present invention for exhausting smoke from the space.
Figure 2:
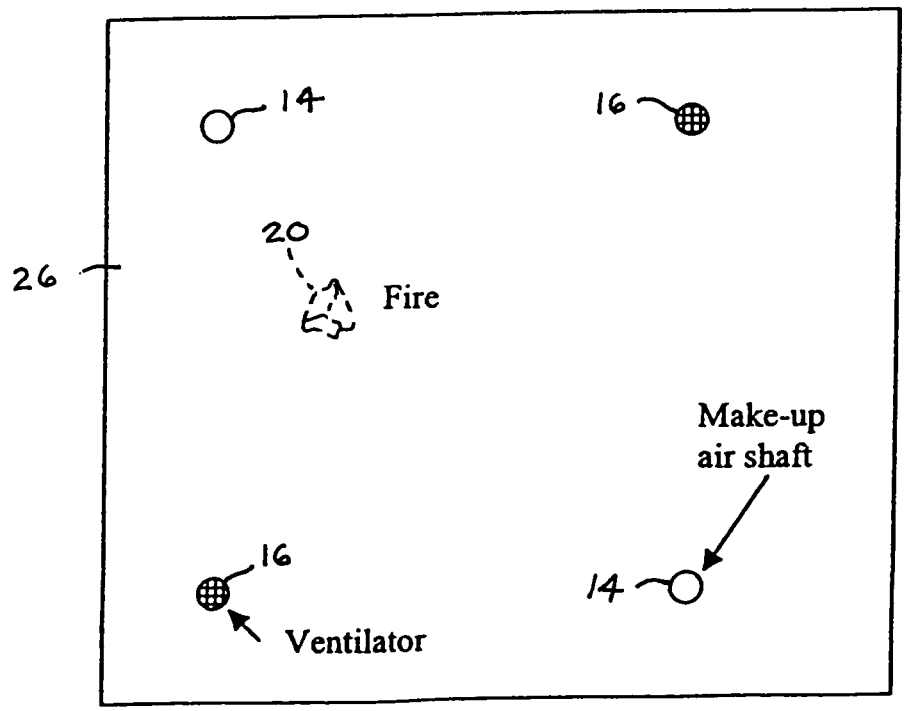
FIG. 2 is a top plan view of the upper boundary of the space of FIG. 1.

FIGS. 1 and 2 depict a system according to the present invention for bringing outside air into a smoke-controlled space 12 by using rigid make-up air shafts 14. As can be seen from FIG. 2, ventilators 16, which can be either powered or buoyancy driven, remove smoke from the space 12 with the help of two of the make-up air shafts 14 that passively admit air from the outside, thereby replacing the flow removed by the ventilators. A fire plume 20 in the space 12 entrains air from the surroundings. Some of the air entrained near the base of the fire is consumed in combustion reactions, while the remainder mixes with combustion products to form smoke, which is deposited in an upper layer 22 by the plume. Air entering through the rigid make-up air shafts 14 is delivered to a lower, clear layer 24 beneath the smoke 22 without entraining any smoke, where the flow first forms a jet entraining clean air, then diffuses throughout the lower, clear layer and is eventually entrained in the fire plume 20. A stable smoke layer is formed when the air mass removal rate by the ventilators 16 is equal to the air mass entrainment rate by the fire plume 20.

The rigid make-up air shafts 14 extend from an upper boundary 26 of the space 12 to below the design elevation of the smoke interface, which is the boundary between the accumulated upper layer of smoke 22 and the lower, clear layer of air. The design elevation of the smoke interface is determined by factoring the air mass removal rate by the ventilators 16 and the air mass entrainment rate by the fire plume 20, using known calculations. It is contemplated that the system according to the present invention will often be used in commercial or industrial buildings, e.g., warehouses. In many of these buildings, goods or equipment will take up considerable space, and the lower ends of the make-up air shafts 14 will be above the goods or equipment, for example, at 20 feet above the floor. It is preferable that the lower ends of the make-up air shafts 14 extend well below the layer of smoke. Thus, where the lower ends of the make-up air shafts 14 are 20 feet above the floor, the design elevation of the smoke interface may well be 30 feet above the floor. In most installations, the lower ends of make-up air shafts 14 will be no lower than about 8 to 10 feet above the floor.

Figure 3:
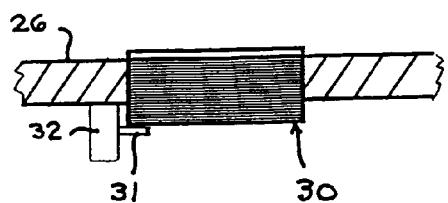
FIG. 3 is a schematic front elevation of a make-up air shaft according to the present invention in a condition primarily at or near the upper boundary of a space.
Figure 4:
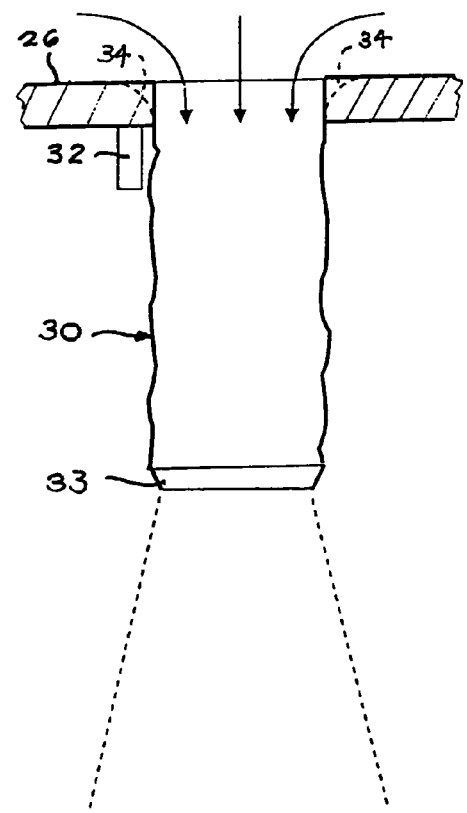
FIG. 4 is a schematic front elevation of the air shaft of FIG. 3 in an extended, deployed condition.

Although the rigid make-up air shafts 14 allow make-up air to enter the space from the roof rather than through openings in the building walls, they may obstruct normal operations in the building. FIGS. 3 and 4 depict an alternative make-up air shaft 30, made of a flexible and fire resistant material, which can be folded until required in a fire, as can be seen in FIG. 3. In the folded condition, the shaft 30 can be contained in a ceiling storage compartment (not shown) having, for example, a hinged lid. As an alternative, the shaft 30 can be supported in the folded condition by a movable finger 31. In either case, on a signal from a fire detector 32, the folded shaft 30 is released simultaneous with activation of the smoke ventilators 16. Make-up air unfolds the shaft 30 and inflates it to become an effective conduit of fresh air, as can be appreciated from FIG. 4. In order to assure inflation, the outlet of the flexible shaft 30 is provided with a slight contraction, as indicated at 33. Without the contraction 33, the pressures within the flexible air conduit would be close to the building pressure. The flexible walls would flap in and out, and stable operation would not be possible. The contraction raises the pressure in the flexible shaft above the building pressure, sufficient to establish a stable inflation of the shaft and a steady delivery of air.

The fire detector 32 can be, for example, a smoke detector or a heat detector. In response to the detection of fire, the fire detector 32 can send a signal to the movable finger 31 or other mechanism that normally holds the shaft 33 in its folded condition but in response to the signal releases the shaft for deployment to its extended condition. Although FIGS. 3 and 4 show the fire detector 32 as being adjacent to the shaft, the fire detector can be located in other positions.

The cross section of the shaft 30 must closely match the inlet cross section from the roof, but can be circular, square or rectangular. The roof entry is preferably contoured, e.g., as indicated by dashed curves 34 in FIG. 4. Roof openings can be covered with shutter units, opened just prior to activation of the ventilators, and with canopies of low air resistance to protect against weather.

Figure 5:
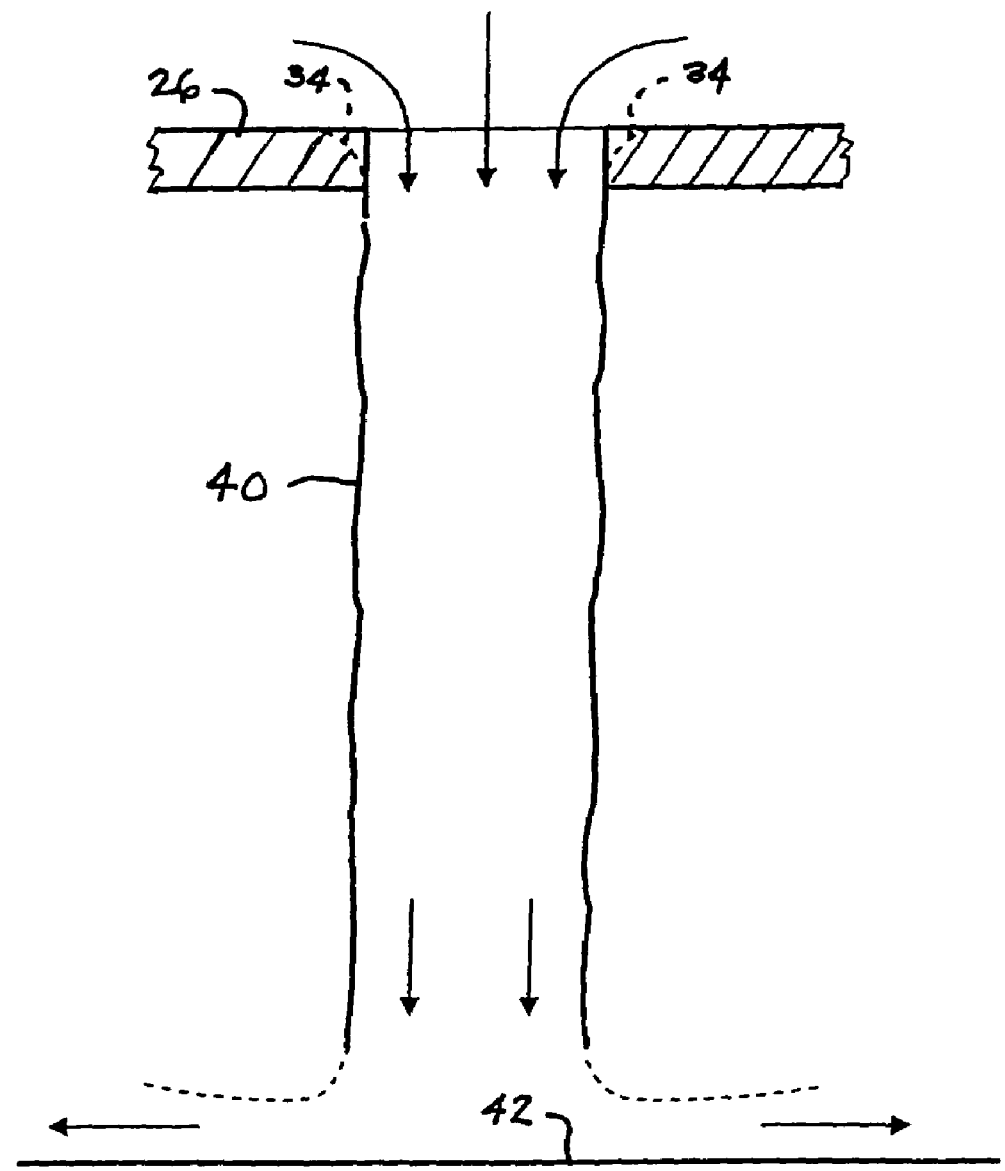
FIG. 5 is a schematic front elevation of another embodiment of an air make-up shaft according to the present invention.

A contraction is not required in a flexible shaft if the shaft operates in ground effect, as does the flexible shaft 40 of FIG. 5. The ground effect embodiment can be used where the building conditions, e.g., the arrangement or absence of goods and equipment and other factors, are such that the shaft 40 can be allowed to extend to within less than one shaft diameter or shaft width (the smaller dimension of rectangular shaft) of an unobstructed floor 42. The proximity to the floor 42 raises the pressure within the shaft 40, and stable inflated operation results.

The invention has been described with respect to flow induced by ventilators in ventilation openings in a building to produce an underpressure in the building (relative to the atmospheric pressure). However, as an alternative, the make-up air shafts can be attached to powered roof ventilators blowing air into the building, matching the shaft diameter to the discharge diameter of the ventilator and letting the air exhaust through passive roof vents, which results in a building overpressure. A further alternative is to use power ventilators at both air entry to the shaft and air exhaust through roof vents to manage the building pressure during smoke control.

The embodiment illustrated and discussed in this specification is intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

What is claimed as new and desired to be protected by Letters Patent of the United States is:

1. A system for exhausting smoke from a space having an upper boundary, wherein the smoke accumulates at or near the upper boundary, comprising:
    at least one make-up air shaft enabling outside air to enter the space, the make-up air shaft positioned at the upper boundary; and
    means for enabling the make-up air shaft to deploy from a first condition, in which the entire make-up air shaft is at or near the upper boundary, to a second condition, in which the make-up air shaft extends from the upper boundary of the space to below the smoke.

2. The system of claim 1, wherein the at least one make-up air shaft comprises a plurality of make-up shafts.

3. The system of claim 1, wherein the at least one make-up air shaft is longitudinally expandable from said first condition, in which the shaft is in a folded state, to said second condition, in which the shaft is longitudinally expanded relative to said first condition.

4. The system of claim 3, wherein the at least one make-up air shaft is foldable.

5. The system of claim 3, wherein the means for enabling comprises:
    a fire detector; and
    means for releasing the at least one make-up air shaft from its first condition, whereby the shaft is extended to said second condition by gravity.

6. The system of claim 1, wherein the upper boundary is a ceiling.

7. The system of claim 1, wherein the air shaft has a transverse flow area and an outlet, and the means for enabling comprises a contraction in the flow area adjacent to the outlet of the duct.

8. A system for exhausting smoke from a space defined by a building, wherein the space has an upper boundary wall, and smoke accumulates from the upper boundary wall of the space downward, comprising:
    at least one opening through the upper boundary wall of the space defined by building to exhaust from the space the smoke that accumulates from the upper boundary wall of the space downward; and
    at least one make-up air shaft communicating through the upper boundary wall with air outside the space and extending downward from the upper boundary wall to below the smoke.

9. The system of claim 8, wherein the at least one opening comprises a plurality of openings.

10. The system of claim 8, wherein the at least one make-up air shaft comprises a plurality of make-up air shafts.

11. The system of claim 8, further comprising a buoyancy-driven ventilator associated with the opening for exhausting smoke through the opening.

12. The system of claim 8, further comprising a power-driven ventilator associated with the opening for exhausting smoke through the opening.

13. The system of claim 8, wherein the shaft has a diameter, the space has a lower boundary, and the shaft extends downward from the upper boundary wall to within one shaft diameter of the lower boundary.

14. The system of claim 8, wherein the shaft has a transverse cross-sectional area having a width, the space has a lower boundary, and the shaft extends downward from the upper boundary wall to within one said width of the lower boundary.

15. The system of claim 8, further comprising an arrangement enabling the make-up air shaft to deploy from a first condition, in which the entire make-up air shaft is at or near the upper boundary wall, to a second condition, in which the make-up air shaft extends from the upper boundary wall of the space to below the smoke.

16. The system of claim 15, wherein the at least one make-up shaft is foldable.

17. The system of claim 15, wherein the means for enabling comprises:
    a fire detector; and
    means for releasing the at least one make-up air shaft from its first conditions whereby the shaft is extended to said second condition by gravity.

18. The system of claim 8, wherein the at least one make-up air shaft is longitudinally expandable from said first condition, in which the shaft is in a folded state, to said second condition, in which the shaft is longitudinally expanded relative to said first condition.

19. A method for exhausting smoke from a space defined by a building, wherein the space has an upper boundary wall, and smoke accumulates from the upper boundary wall of the space downward, comprising:
    exhausting from the space of a building through at least one opening in the upper boundary wall the smoke that accumulates from the upper boundary wall of the space downward; and
    introducing make-up air into the space through at least one make-up air shaft communicating through the upper boundary wall with air outside the space and extending downward from the upper boundary wall to below the smoke.

* * * * *